C. E. DOUGLAS.
WEED CUTTING IMPLEMENT.
APPLICATION FILED MAR. 4, 1914.
1,142,503.
Patented June 8, 1915.
2 SHEETS—SHEET 2.
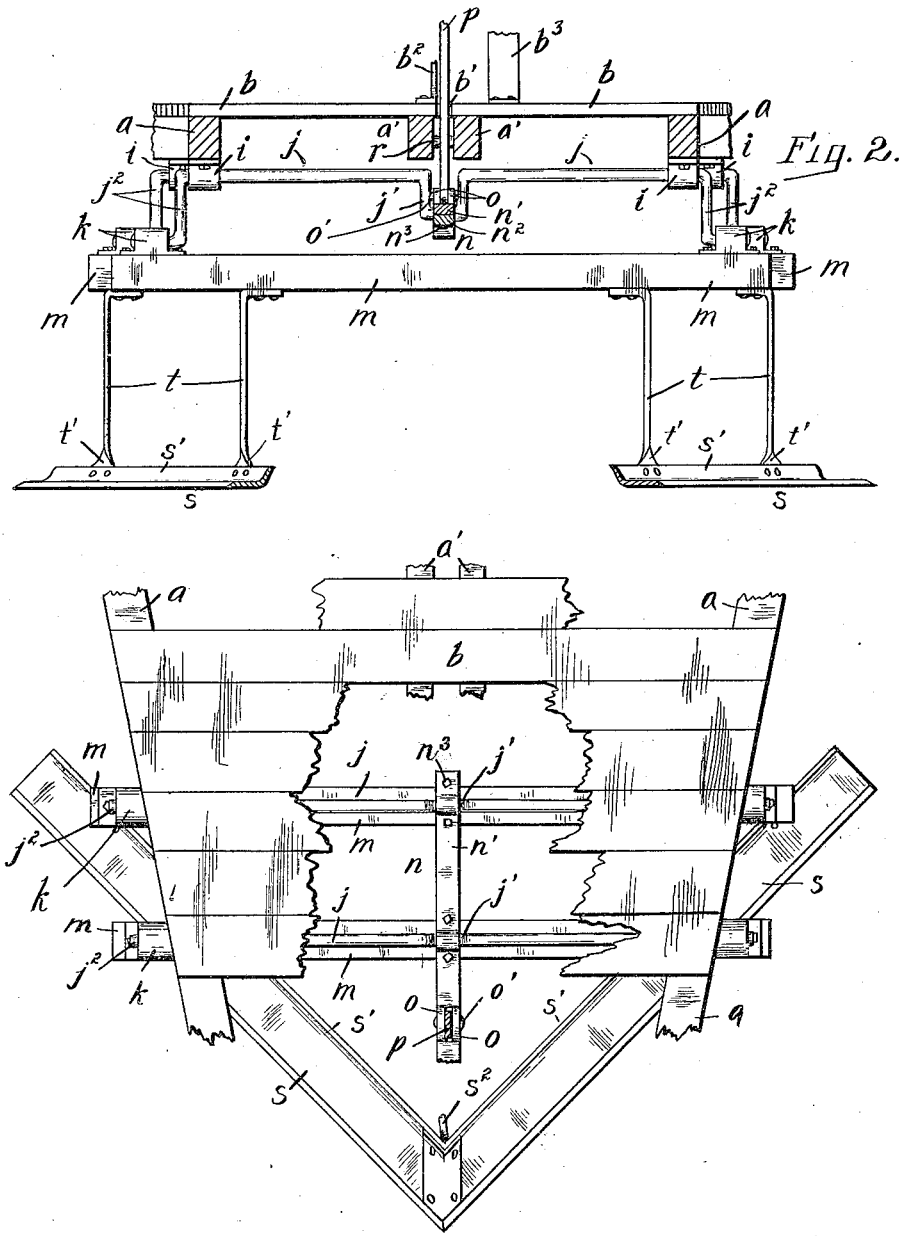
WITNESSES:
INVENTOR
Charles E. Douglas.
BY
ATTORNEY

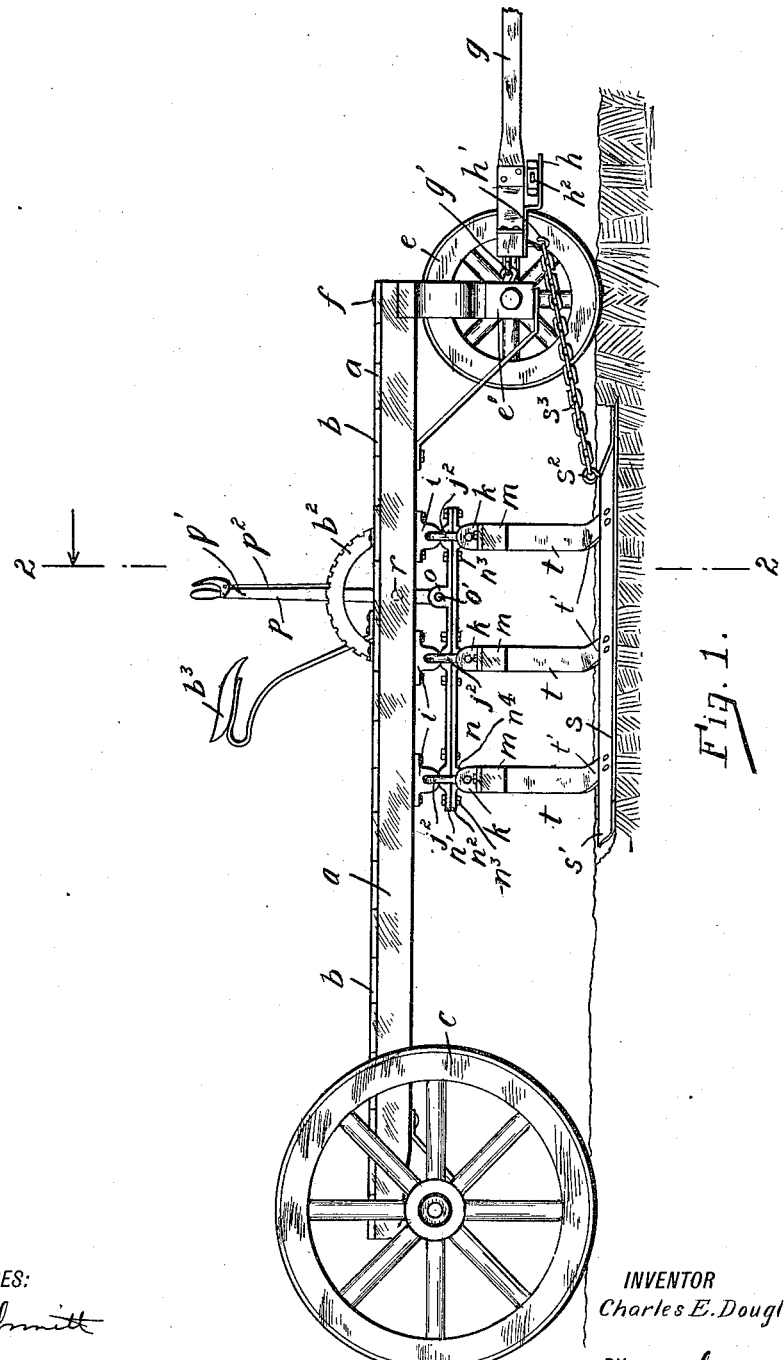

UNITED STATES PATENT OFFICE.

CHARLES E. DOUGLAS, OF TURNER, OREGON.

WEED-CUTTING IMPLEMENT.

1,142,503.        Specification of Letters Patent.        Patented June 8, 1915.

Application filed March 4, 1914. Serial No. 822,540.

*To all whom it may concern:*

Be it known that I, CHARLES E. DOUGLAS, a citizen of the United States, and a resident of Turner, in the county of Marion, State of Oregon, have invented a new and useful Improvement in Weed-Cutting Implements, of which the following is a specification.

My invention relates to improvements in weed-cutting implements or devices.

In certain localities the rapid growth of weeds is a source of great annoyance to the farmer, and in some localities these weeds spring up in freshly plowed land so fast that it is impossible for the farmer to proceed with his subsequent work of cultivation. It has been discovered that the cutting of these weeds above the surface only acts as a stimulant to their further growth, but when cut close to their roots they will die.

One of the objects of my invention is, therefore, to provide a simple, durable device adapted for cutting the weeds beneath the surface of the soil.

My invention comprises a cutter blade suspended from a vehicle body by means permitting the cutter blade to be raised and lowered relatively to the depth at which the cutting is done.

My invention further includes a novel and beneficial feature with regard to taking care of the strain on the cutter blade when at work.

Other novel features of my invention are hereinafter fully described.

In the accompanying drawings: Figure 1 is a side elevation of my implement with the right forward wheel removed; Fig. 2 is a transverse section taken approximately on the line 2—2 of Fig. 1; and Fig. 3 is a fragmental plan or top view showing a detail of construction.

The body of my implement comprises longitudinally extending sills, $a$, $a'$, covered over by the floor $b$. The body is mounted on the rear wheels, $c$, and the front wheels $e$; the front wheel axle $e'$ being rotatable about the king-pin $f$. A tongue $g$ is connected to the axle $e'$ by hooks and eyes $g'$ in the usual way. Located beneath the tongue $g$ is a Z-shaped metal arm $h$ which forms a bearing for the whiffle trees $h^2$; and at the rear end of the tongue $g$ is a downwardly projecting hook $h'$.

Fastened on the bottom of the sills, $a$, are journal boxes, $i$, in which are journaled the transverse crank shafts $j$ formed with a middle crank-portion $j'$ and crank arms $j^2$ at their extremities. The crank-arms $j^2$ support the weed cutting device. This consists of a frame comprising a series of cross beams $m$, on which are fastened the supporting elements or hangers, $t$, on the lower ends of which is fastened the cutter blade $s$. See Fig. 2. The cutter blade is preferably arranged angular or V-shaped. See Fig. 3. The cutter blade $s$ is further preferably upturned at the back, as indicated at $s'$ in Fig. 2. The blade is riveted to the lower outturned portions $t'$ of the hangers $t$. The crank arms $j^2$ of the crank shafts $j$ bear in the journal boxes $k$ mounted on the cross beams $m$; and the middle crank portions $j'$ of the crank shafts $j$ are connected by a bar $n$. For convenience of assembling I make the bar $n$ of two parts $n'$, $n^2$, provided with knuckle portions $n^4$ constituting journal bearings for said middle crank portions $j'$ of the crank shafts $j$. Bolts $n^3$ clamp the parts $n'$, $n^2$ firmly together. The top part $n'$ is made with vertically projecting ears $o$, to which the lever $p$ is rotatably connected by a pin $o'$.

On the floor $b$ is mounted a quadrant and lever $b^2$, $p$, the floor being provided with a slot $b'$ to accommodate the lever $p$. A pivot pin $r$, carried between the sills, $a'$, forms a fulcrum for the lever $p$. The latter has the usual pawl $p^2$ controlled by a spring $p'$. The driver's seat $b^3$ is located convenient to the lever $p$.

Located near the vertex of the cutting blade $s$ is a hook $s^2$, and a chain $s^3$ is connected with this hook and the hook on the under side of the draft pole $g$.

When the device is in operation the pull on the whiffle trees $h^2$ will tend to throw the forward end of the draft pole upward, and the chain $s^3$ will be put in tension, thereby exerting a direct pull on the cutter blade and preventing any great strain from being thrown on the supporting elements $t$. When it is desired to raise the cutter blade $s$, the lever $p$ may be released and thrown backward; the movement of the lever $p$ being communicated through the medium of the bar $n$ to the crank shafts $j$ and causes the latter to rotate in unison, thereby lifting or lowering the cutter blade $s$ so as to clear or cut under the ground.

I claim:

1. In an implement of the character described, the combination of a plurality of crank shafts having crank elements at their extremities and intermediate the latter, supporting elements pendent from the extremities of the crank shafts, a bar connecting the intermediate crank elements of said crank shafts, a V-shaped cutter blade fastened to the lower ends of the supporting elements, and means for moving said bar longitudinally.

2. In an implement of the character described the combination of a plurality of crank shafts having crank elements at their extremities and intermediate the latter, supporting elements pendent from the extremities of the crank shafts, the lower ends of said supporting elements bent horizontally, transverse bracing elements connecting the supporting elements in pairs, a bar connecting the intermediate crank elements of said crank shafts, a V-shaped cutter blade fastened to the lower ends of the supporting elements, the back of the cutter blade being turned up, and a lever attached to said bar, a notched quadrant and locking means engaging therewith carried by the lever.

CHARLES E. DOUGLAS.

Witnesses:
JAMES M. BAUER,
A. L. BONES.

Copies of this patent may be obtained for five cents each, by addressing the "Commissioner of Patents, Washington, D. C."